(12) United States Patent
Tateno

(10) Patent No.: US 10,880,083 B2
(45) Date of Patent: Dec. 29, 2020

(54) INFORMATION PROCESSING APPARATUS AND METHOD

(71) Applicant: FUJITSU LIMITED, Kawasaki (JP)

(72) Inventor: Takanori Tateno, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 419 days.

(21) Appl. No.: 16/006,910

(22) Filed: Jun. 13, 2018

(65) Prior Publication Data

US 2018/0367300 A1 Dec. 20, 2018

(30) Foreign Application Priority Data

Jun. 20, 2017 (JP) ................... 2017-120354

(51) Int. Cl.
*H04L 29/06* (2006.01)
*H04L 9/08* (2006.01)

(52) U.S. Cl.
CPC ........ *H04L 9/0894* (2013.01); *H04L 2209/08* (2013.01)

(58) Field of Classification Search
CPC .......................... H04L 9/0894; H04L 2209/08
See application file for complete search history.

(56) References Cited

U.S. PATENT DOCUMENTS

| 6,625,625 | B1* | 9/2003 | Kihara | ................. | G06F 11/1453 |
| 2006/0136777 | A1* | 6/2006 | Terashita | ............ | G06F 11/1076 |
| | | | | | 714/6.12 |
| 2008/0019503 | A1* | 1/2008 | Dupaquis | ................. | H04L 9/003 |
| | | | | | 380/28 |
| 2008/0229118 | A1* | 9/2008 | Kasako | ................... | G06F 21/80 |
| | | | | | 713/193 |

(Continued)

FOREIGN PATENT DOCUMENTS

| JP | 6-348419 | 12/1994 |
| JP | 2000-293420 | 10/2000 |
| JP | 2003-208355 | 7/2003 |

OTHER PUBLICATIONS

Kevin Fu, "Group Sharing and Random Access in Cryptographic Storage File Systems", Retrieved From http://groups.csail.mit.edu/cis/theses/fu-masters.pdf, Published 1999. (Year: 1999).*

*Primary Examiner* — Chau Le
(74) *Attorney, Agent, or Firm* — Fujitsu Patent Center

(57) ABSTRACT

An information processing apparatus includes a processor configured to receive, respectively from a plurality of external devices, plural pieces of encrypted data encrypted with a random number sequence. The processor generates parity data by using the received plural pieces of encrypted data. The processor stores the generated parity data in a memory. The processor receives a restoration request for restoring first encrypted data from a first external device among the plurality of external devices. The processor receives, respectively from one or more second external devices among the plurality of external devices other than the first external device, one or more pieces of second encrypted data among the plural pieces of encrypted data other than the first encrypted data. The processor restores the first encrypted data by using the received one or more pieces of second encrypted data and the parity data stored in the memory.

9 Claims, 17 Drawing Sheets

(56) References Cited

U.S. PATENT DOCUMENTS

| | | | | |
|---|---|---|---|---|
| 2013/0124804 A1* | 5/2013 | Suzuki | ............... | G06F 1/30 |
| | | | | 711/147 |
| 2013/0124873 A1* | 5/2013 | Nakagawa | .......... | G06F 11/2094 |
| | | | | 713/189 |
| 2013/0208892 A1* | 8/2013 | Moriguchi | ............ | G06F 21/805 |
| | | | | 380/277 |
| 2015/0278018 A1* | 10/2015 | Kato | ................... | G06F 11/1076 |
| | | | | 714/764 |
| 2018/0367300 A1* | 12/2018 | Tateno | ................. | H04L 9/0894 |

* cited by examiner

INFORMATION PROCESSING APPARATUS AND METHOD

CROSS-REFERENCE TO RELATED APPLICATION

This application is based upon and claims the benefit of priority of the prior Japanese Patent Application No. 2017-120354, filed on Jun. 20, 2017, the entire contents of which are incorporated herein by reference.

FIELD

The embodiments discussed herein are related to an information processing apparatus and an information processing method.

BACKGROUND

In existing techniques, when data of a plurality of users is retained as a backup in a data center, the data center prepares an individual disk capacity (storage capacity) for each user in a storage device of an information processing apparatus included in the data center to retain the data of each user. An example in which Company C1, Company C2, and Company C3, which are the users, delegate management of backup of their data to a data center P is illustrated in FIG. 17.

An information processing apparatus 110-1 of Company C1, which delegates data backup, performs an exclusive-or operation of data (D1) 111-1 to be backed up and a random number sequence (R1) 112-1 used for communication with the data center P to encrypt the data (D1), and transmits an operation result (D1#R1) to the data center P. Note that the symbol "#" denotes an exclusive-or (similarly hereinafter).

Likewise, an information processing apparatus 110-2 of Company C2 performs an exclusive-or operation of data (D2) 111-2 to be backed up and a random number sequence (R2) 112-2 used for communication with the data center P and transmits an operation result (D2#R2) to the data center P. In addition, an information processing apparatus 110-3 of Company C3 performs an exclusive-or operation of data (D3) 111-3 to be backed up and a random number sequence (R3) 112-3 used for communication with the data center P and transmits an operation result (D3#R3) to the data center P.

The data center P prepares individual disk capacities (storage capacities) 121-1, 121-2, and 121-3, respectively for Company C1, Company C2, and Company C3 in a storage device of the information processing apparatus 120 included in the data center P. Data (D1#R1), (D2#R2), and (D3#R3) from the companies are respectively retained on the prepared disks 121-1, 121-2, and 121-3.

Related techniques are disclosed in, for example, in Japanese Laid-open Patent Publication No. 6-348419, Japanese Laid-open Patent Publication No. 2000-293420, and Japanese Laid-open Patent Publication No. 2003-208355.

As described above, in existing techniques, when data of a plurality of users is retained as the backups in a data center, individual data is retained as backup data for each user in the data center. Accordingly, as the number of users who delegate backup of data increases, the amount of backup data that the information processing apparatus of the data center retains increases accordingly.

SUMMARY

According to an aspect of the present invention, provided is an information processing apparatus including a memory and a processor coupled to the memory. The processor is configured to receive, respectively from a plurality of external devices, plural pieces of encrypted data encrypted with a random number sequence. The processor is configured to generate parity data by using the received plural pieces of encrypted data. The processor is configured to store the generated parity data in the memory. The processor is configured to receive a restoration request for restoring first encrypted data from a first external device among the plurality of external devices. The processor is configured to receive, respectively from one or more second external devices among the plurality of external devices other than the first external device one or more pieces of second encrypted data among the plural pieces of encrypted data other than the first encrypted data. The processor is configured to restore the first encrypted data by using the received one or more pieces of second encrypted data and the parity data stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of the present disclosure will be described with reference to the accompanying drawings.

Note that, in the description hereinafter, the symbol "#" denotes an exclusive-or, and, for example, "X#Y" denotes a result of an exclusive-or operation of X and Y.

First Embodiment

A first embodiment of the present disclosure will be described.

Figure 1:
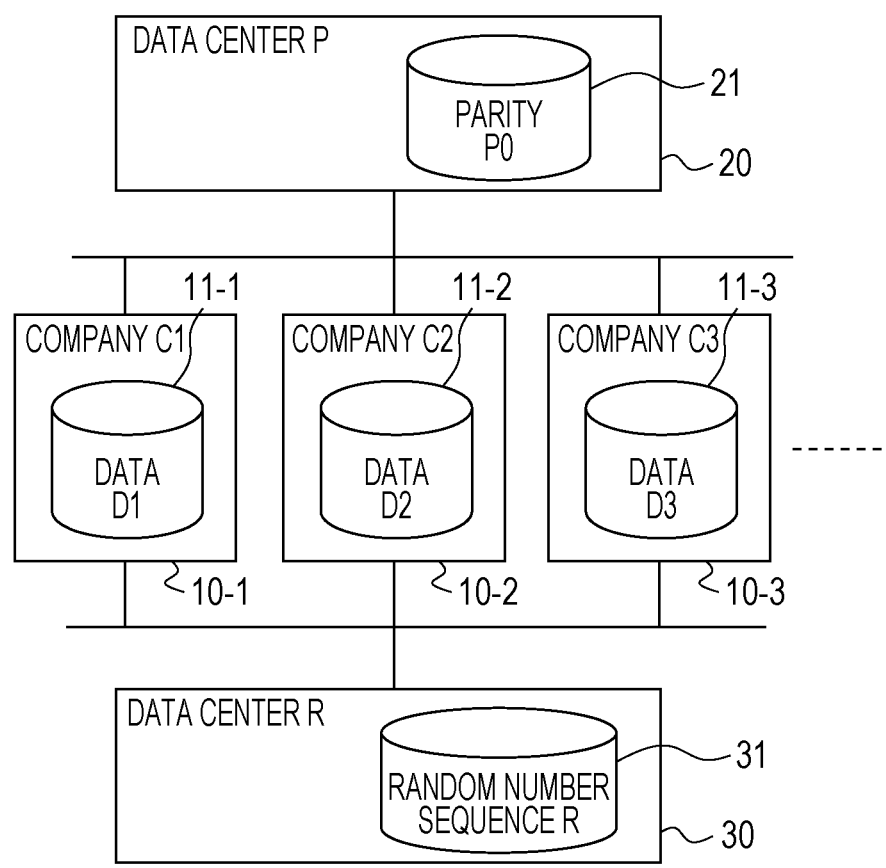
FIG. 1 is a diagram illustrating an example of a configuration of a data management system in a first embodiment.

FIG. 1 is a drawing illustrating an example of a configuration of a data management system in the first embodiment. Company C1, Company C2, Company C3, . . . are users who delegate management of backup of their data to the data center P and a data center R. An information processing apparatus 10-1 of Company C1 retains data (D1) 11-1, an information processing apparatus 10-2 of Company C2 retains data (D2) 11-2, and an information processing apparatus 10-3 of Company C3 retains data (D3) 11-3.

An information processing apparatus 20 of the data center P manages backup data of a plurality of users in the form of parity data (P0) 21. That is, the information processing apparatus 20 of the data center P retains, as backup data, parity data (P0) 21 generated based on data to be backed up of the plurality of users. An information processing apparatus 30 of the data center R retains a random number sequence (R) 31 with which the plurality of users communicate with the data center P. The random number sequence (R) 31 is used as an encryption key in encrypting data to be backed up and as a decryption key in decrypting encrypted data.

Figure 2:
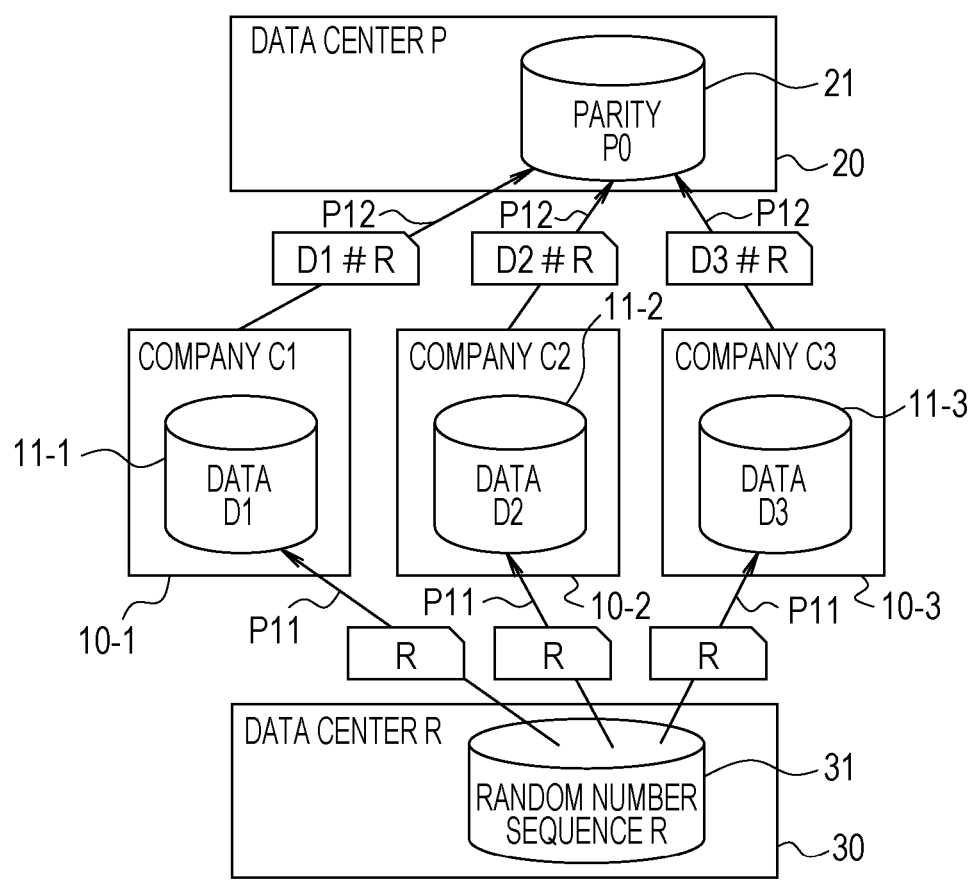
FIG. 2 is a diagram illustrating backup of data in the first embodiment.
Figure 3:
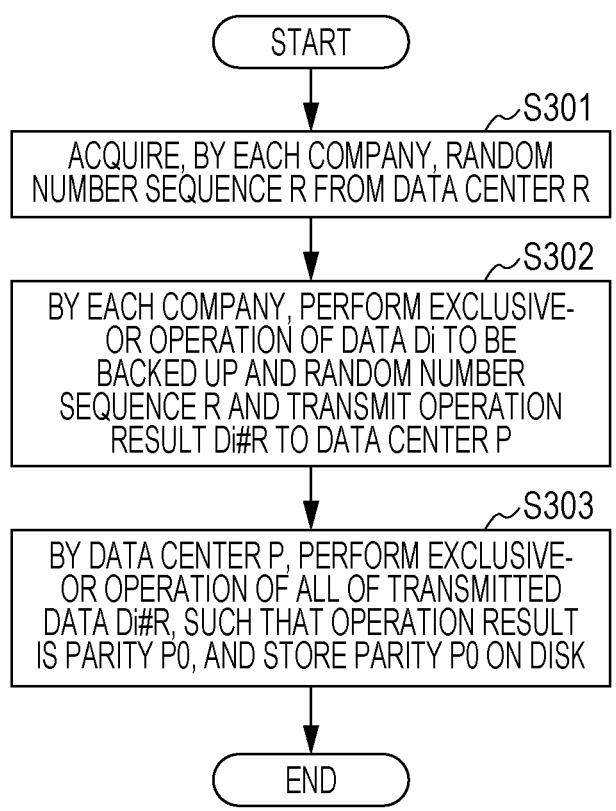
FIG. 3 is a flowchart illustrating an example of a data backup process in the first embodiment.

Backup of data in the first embodiment will be described with reference to FIG. 2 and FIG. 3. The case where three users, Company C1, Company C2, and Company C3, delegate management of backup of their data will be described below by way of example. FIG. 2 is a diagram illustrating backup of data in the first embodiment, and FIG. 3 is a flowchart illustrating an example of a data backup process in the first embodiment.

First, in step S301, the information processing apparatuses 10-1, 10-2, and 10-3 of the three companies, Company C1, Company C2, and Company C3, acquire the random number sequence (R) 31 from the information processing apparatus 30 of the data center R (P11).

Next, in step S302, the information processing apparatuses 10-1, 10-2, and 10-3 of the companies each perform an exclusive-or operation of data (Di) 11-1 to be backed up and the random number sequence (R) acquired in step S301 and transmit an operation result (Di#R) to the information processing apparatus 20 (P12). That is, the information processing apparatuses 10-1, 10-2, and 10-3 each encrypt the data (Di) 11-$i$ to be backed up by using the random number sequence (R) acquired in step S301 and transmit the encrypted data to the information processing apparatus 20 of the data center P. Note that i is an index, and i=1, 2, or 3 here.

Next, in step S303, the information processing apparatus 20 of the data center P performs an exclusive-or operation of the data (Di#R) sent from the information processing apparatuses 10-1, 10-2, and 10-3 of the companies, such that the operation result is parity data (P0). In this example, the parity data (P0) is (D1#R)#(D2#R)#(D3#R). The information processing apparatus 20 of the data center P then stores and retains the parity data (P0) as backup data on the disk 21.

Note that it is assumed in the description given above that, at the same time, the information processing apparatuses 10-1, 10-2, and 10-3 of the companies each encrypt data (Di) 11-$i$ to be backed up and transmit the encrypted data to the information processing apparatus 20 of the center P. However, since the information processing apparatus 20 of the data center P performs an exclusive-or operation of the sent data (Di#R) to generate parity data (P0), the time at which the data (Di) 11-$i$ to be backed up is encrypted and transmitted to the information processing apparatus 20 is arbitrary and may differ.

Figure 4:
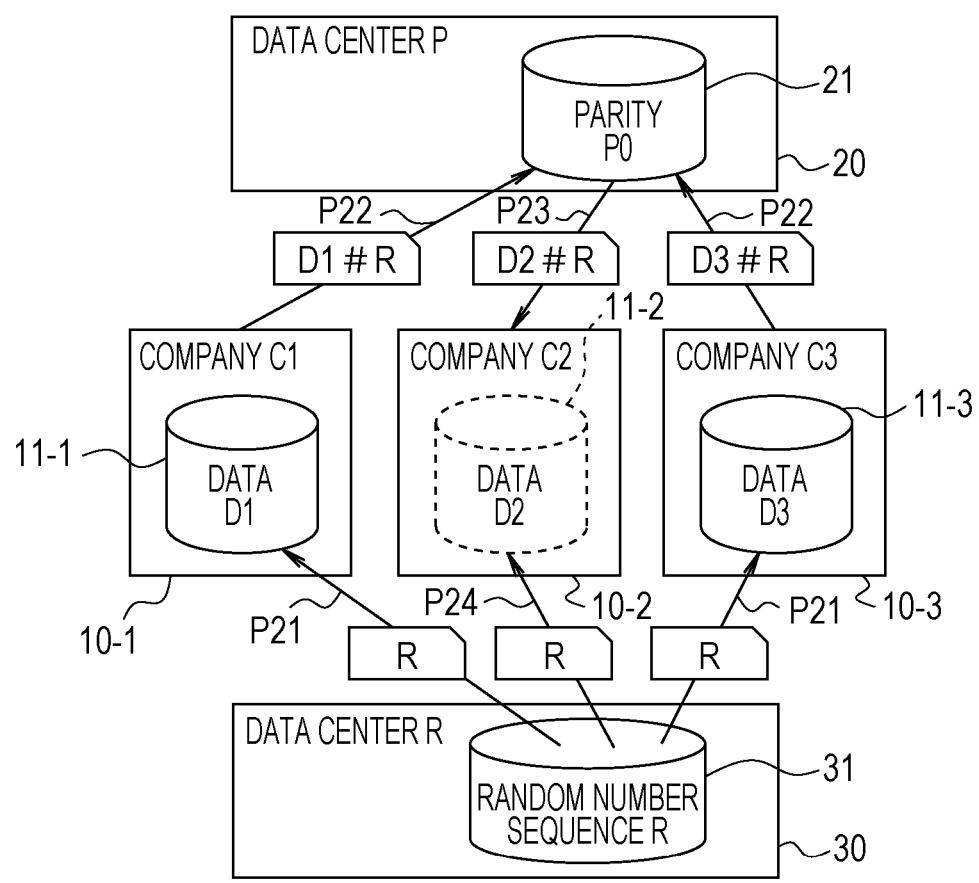
FIG. 4 is a diagram illustrating restoration of data in the first embodiment.
Figure 5:
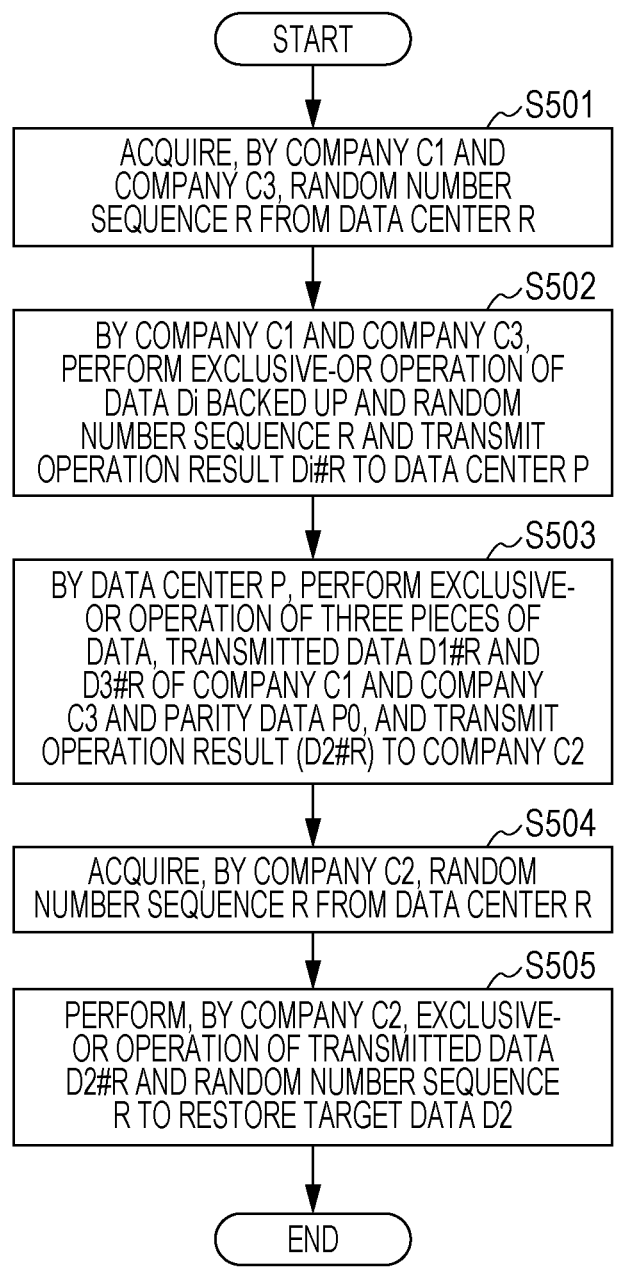
FIG. 5 is a flowchart illustrating an example of a data restoration process in the first embodiment.

Next, data restoration from data that has been backed up as described above will be described with reference to FIG. 4 and FIG. 5. The case where the data (D2) 11-2 of the user, Company C2, is restored will be described below by way of example; however, other data (D1 and D3) 11-1 and 11-3 is able to be restored likewise. FIG. 4 is a diagram illustrating restoration of data in the first embodiment, and FIG. 5 is a flowchart illustrating an example of a data restoration process in the first embodiment.

First, in step S501, the information processing apparatuses 10-1 and 10-3 of Company C1 and Company C3 whose data is not to be restored acquire the random number sequence (R) 31 from the information processing apparatus 30 of the data center R (P21). Next, in step S502, the information processing apparatuses 10-1 and 10-3 of Company C1 and Company C3 each perform an exclusive-or operation of the data (Di) 11-$i$ backed up and the random number sequence (R) acquired in step S501 and transmit an operation result (Di#R) to the information processing apparatus 20 of the data center P (P22). Note that i is an index, and i=1 or 3 here.

Next, in step S503, the information processing apparatus 20 of the data center P performs an exclusive-or operation of three pieces of data, data (D1#R and D3#R) sent from the information processing apparatuses 10-1 and 10-3 of Company C1 and Company C3 and the parity data (P0). Here, since the parity data (P0) is (D1#R)#(D2#R)#(D3#R), the result of this operation (D1#R)#(D3#R)#(P0) is equal to the exclusive-or (D2#R) of the data (D2) to be restored and the random number sequence (R). The information processing apparatus 20 of the data center P then transmits the operation result (D2#R) to the information processing apparatus 10-2 of Company C2 whose data is to be restored (P23).

In step S504, the information processing apparatus 10-2 of Company C2 whose data is to be restored acquires the random number sequence (R) 31 from the information processing apparatus 30 of the data center R (P24). Next, in step S505, the information processing apparatus 10-2 of Company C2 performs an exclusive-or operation of the data (D2#R) sent from the information processing apparatus 20 of the data center P and the random number sequence (R) acquired in step S504 to restore the data (D2) 11-2. Note that execution of step S504 is not limited to the example illustrated in FIG. 5, and step S504 may be executed at any point prior to executing step S505.

Figure 6:
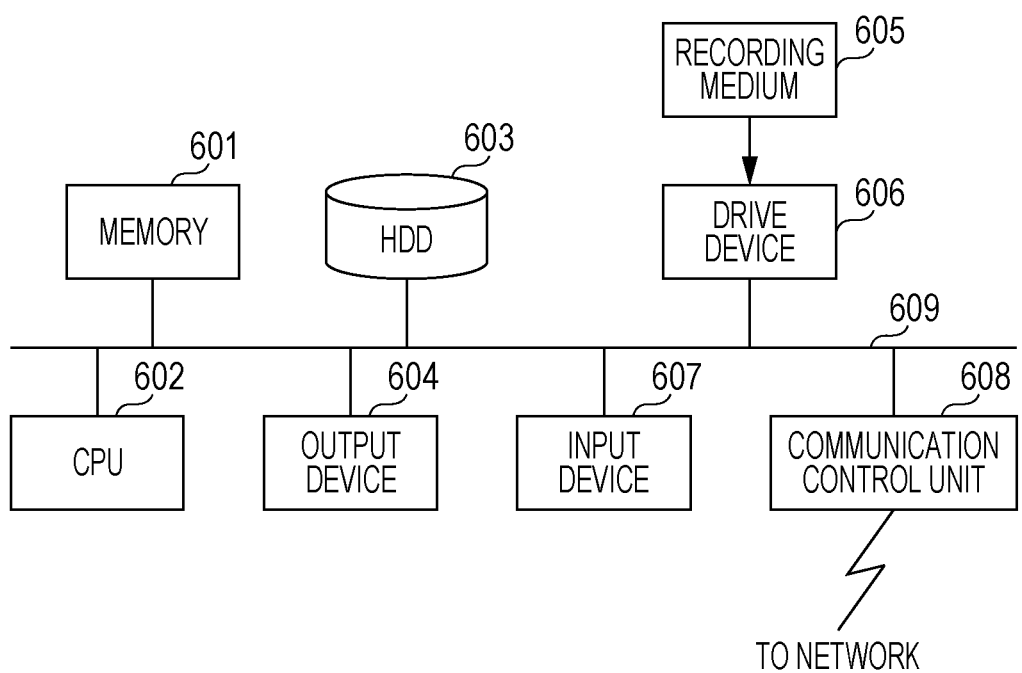
FIG. 6 is a diagram illustrating an example of a configuration of an information processing apparatus in the present embodiments.

FIG. 6 is a diagram illustrating an example of a configuration of each information processing apparatus in the present embodiments. In the information processing apparatus illustrated in FIG. 6, a memory 601, a central processing unit (CPU) 602, a hard disk drive (HDD) 603, an output device 604, a drive device 606 for a recording medium 605, an input device 607, and a communication control unit 608 for coupling to a network are coupled via a bus 609. For example, the functions of a first arithmetic processing unit and a second arithmetic processing unit are achieved by the CPU 602 in the information processing apparatus 20 of the data center P, and the function of a storage unit is achieved by the HDD 603. An operating system (OS) and application programs for executing the processes described above are stored on the HDD 603 and, when executed by the CPU 602, are read from the HDD 603 into the memory 601.

The CPU 602 controls the output device 604, the drive device 606, the communication control unit 608, and the like in accordance with the processing details of application programs to cause these units to perform predetermined operations. In addition, data being processed is stored mainly in the memory 601 but may be stored on the HDD 603. In this example, application programs for executing the processes described above are stored and distributed, for example, on the computer-readable portable recording medium 605 and are installed in the HDD 603 from the drive device 606. In some cases, the application programs are installed in the HDD 603 via a network, such as the Internet, and the communication control unit 608. In such a computer, hardware such as the CPU 602 and the memory 601 mentioned above and software such as the OS and application programs systematically cooperate to thereby implement various functions described above.

According to the first embodiment, the information processing apparatus 20 of the data center P itself does not store therein data sent from a plurality of users but generates parity data based on data sent from the plurality of users and stores therein the generated data as backup data, and therefore, the amount of backup data retained therein may be reduced. In addition, in restoring data backed up, the data is able to be restored by using data other than the data to be restored, the parity data, and the random number sequence.

In addition, since encrypted data is input to and output from the data center P and the data center P itself does not have information of a random number sequence used for encryption, it is not possible in the data center P to restore data backed up. In addition, the data center R has only information of a random number sequence and has no access to data. Accordingly, information leakage from the data center side may be inhibited. In addition, since data backed up is able to be restored by using data acquired from the data center P and the data center R, the data backed up is able to be restored, for example, even if data is corrupted because of a disaster or the like on the user side.

Note that although it is assumed in the example described above that the information processing apparatus 30 of the data center R retains the random number sequence (R) 31 and provides the same random number sequence (R) 31 to the information processing apparatuses 10-1 to 10-3 of the users, a different random number sequence for each user may be provided. Providing the same random number sequence may reduce the storage capacity to be used for storage of random number sequences, while providing a different random number sequence for each user may provide improved security for information.

Second Embodiment

Next, a second embodiment of the present disclosure will be described. In the second embodiment described below, the data center R retaining a random number sequence is not provided, and random number sequences are retained on the side of users (Company C1, Company C2, Company C3, . . . ) who delegate management of backup of their data to the data center P.

Figure 7:
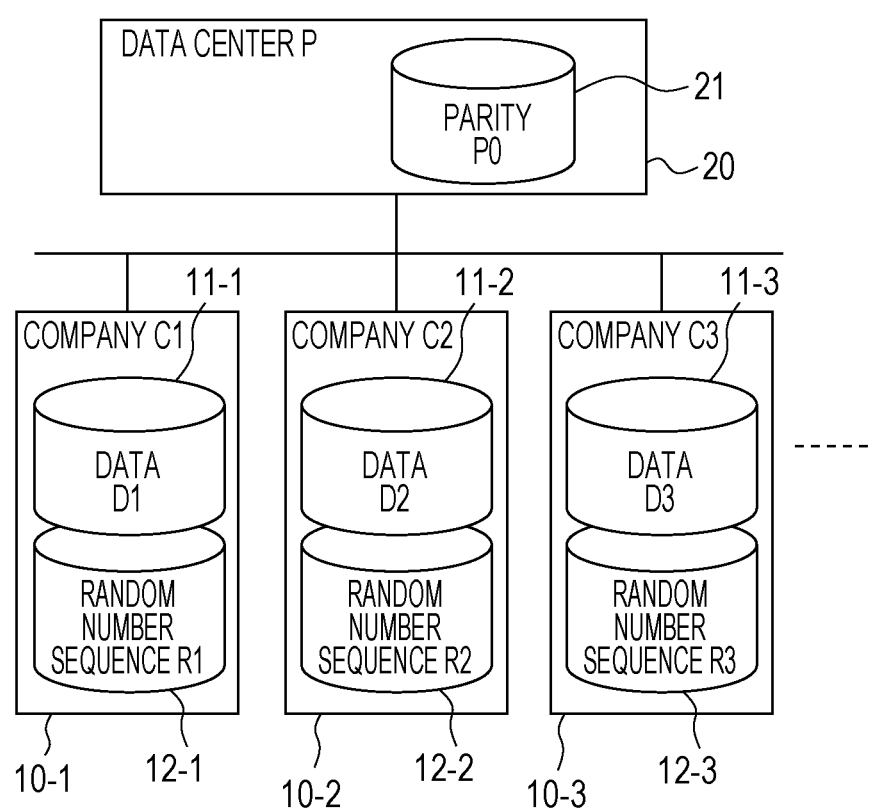
FIG. 7 is a diagram illustrating an example of a configuration of a data management system in a second embodiment.

FIG. 7 is a diagram illustrating an example of a configuration of a data management system in the second embodiment. The information processing apparatus 10-1 of Company C1 retains the data (D1) 11-1 and a random number sequence (R1) 12-1, the information processing apparatus 10-2 of Company C2 retains the data (D2) 11-2 and a random number sequence (R2) 12-2, and the information processing apparatus 10-3 of Company C3 retains the data (D3) 11-3 and a random number sequence (R3) 12-3. The random number sequences (R1 to R3) 12-1 to 12-3 are random number sequences with which the respective users communicate with the data center P, and are used as encryption keys in encrypting data to be backed up and as decryption keys in decrypting the encrypted data.

The information processing apparatus 20 of the data center P, as is the case in the first embodiment, manages backup data of a plurality of users in the form of parity data (P0) 21. That is, the information processing apparatus 20 of the data center P retains, as backup data, the parity data (P0) 21 generated based on data to be backed up of the plurality of users.

Figure 8:
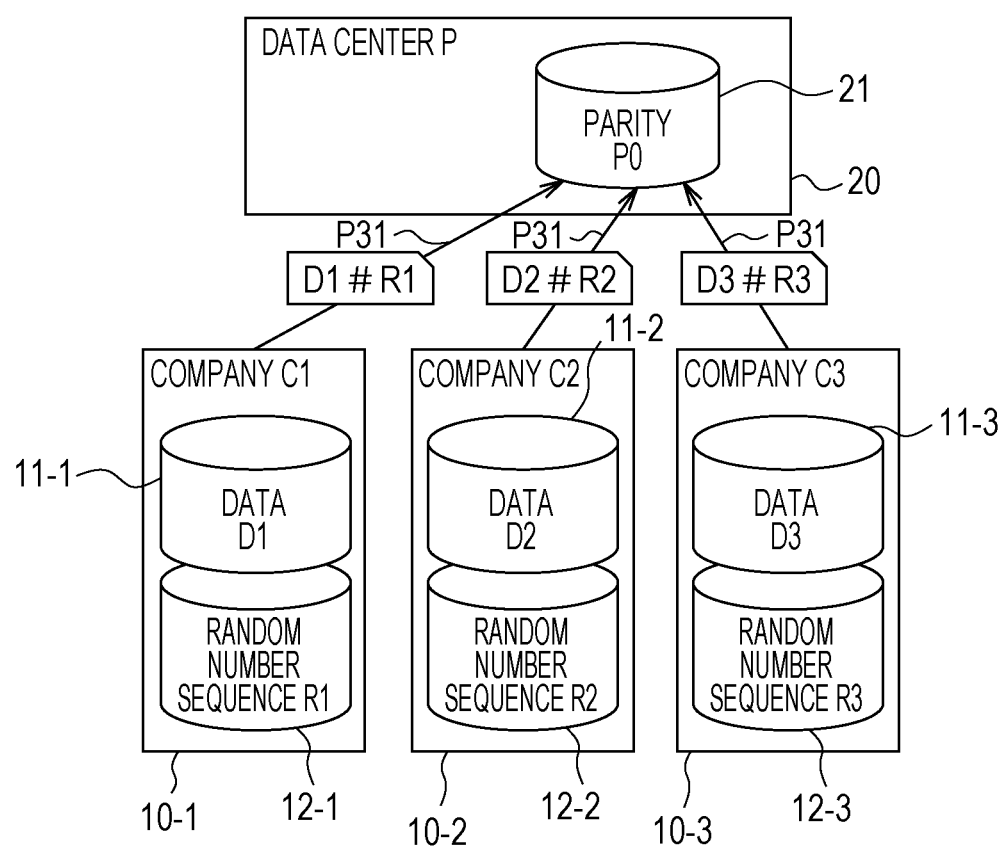
FIG. 8 is a diagram illustrating backup of data in the second embodiment.
Figure 9:
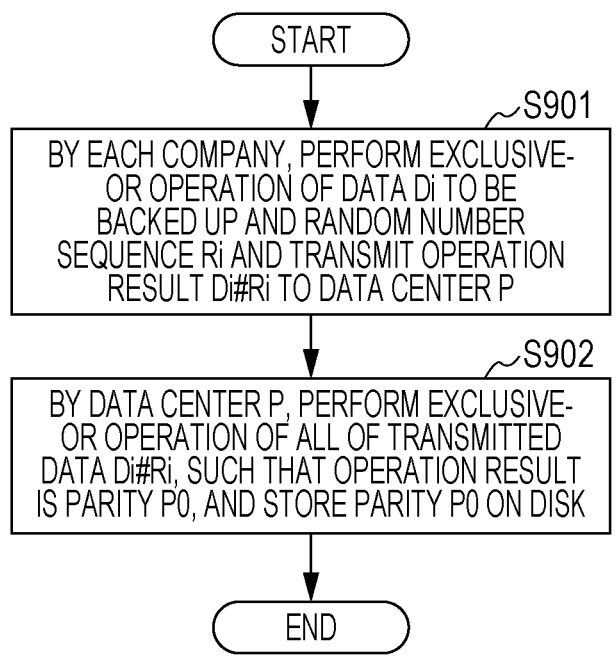
FIG. 9 is a flowchart illustrating an example of a data backup process in the second embodiment.

Backup of data in the second embodiment will be described with reference to FIG. 8 and FIG. 9. The case where three users, Company C1, Company C2, and Company C3, delegate management of backup of their data will be described below by way of example. FIG. 8 is a diagram illustrating backup of data in the second embodiment, and FIG. 9 is a flowchart illustrating an example of a data backup process in the second embodiment.

In step S901, the information processing apparatuses 10-1, 10-2, and 10-3 of the three companies, Company C1, Company C2, and Company C3, each perform an exclusive-or operation of data (Di) 11-$i$ to be backed up and a random number sequence (Ri) 12-$i$ and transmit an operation result (Di#Ri) to the information processing apparatus 20 of the data center P (P31). That is, the information processing apparatuses 10-1, 10-2, and 10-3 each encrypt the data (Di) 11-$i$ to be backed up by using the random number sequence (Ri) 12-$i$ and transmit the encrypted data to the information processing apparatus 20 of the data center P. Note that i is an index, and i=1, 2, or 3 here.

Next, in step S902, the information processing apparatus 20 of the data center P performs an exclusive-or operation of the data (Di#Ri) sent from the information processing apparatuses 10-1, 10-2, and 10-3 of the companies, such that the operation result is parity data (P0). In this example, the parity data (P0) is (D1#R1)#(D2#R2)#(D3#R3). The information processing apparatus 20 of the data center P then stores and retains the parity data (P0) as backup data on the disk 21.

Note that it is assumed in the description given above that, at the same time, the information processing apparatuses 10-1, 10-2, and 10-3 of the companies transmit the data (Di#Ri) to the information processing apparatus 20 of the data center P. However, since the information processing apparatus 20 of the data center P performs an exclusive-or operation of the sent data (Di#Ri) to generate the parity data (P0), the time at which the data (Di#Ri) is transmitted to the information processing apparatus 20 is arbitrary and may differ.

Figure 10:
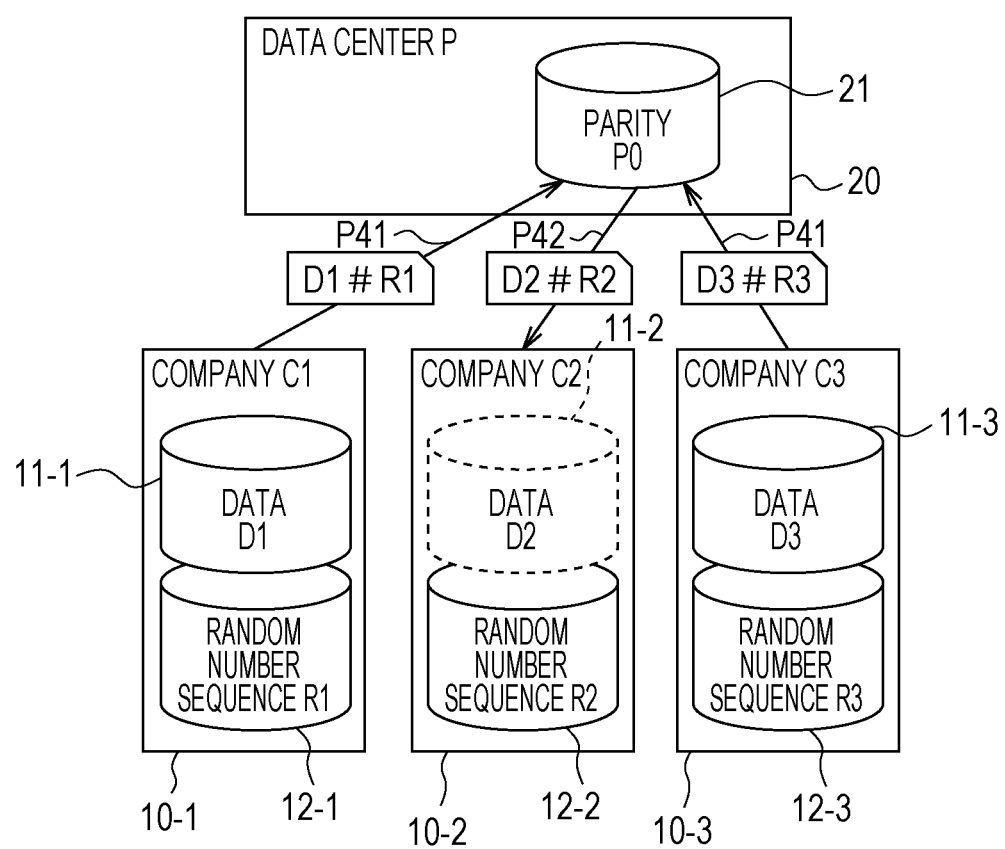
FIG. 10 is a diagram illustrating restoration of data in the second embodiment.
Figure 11:
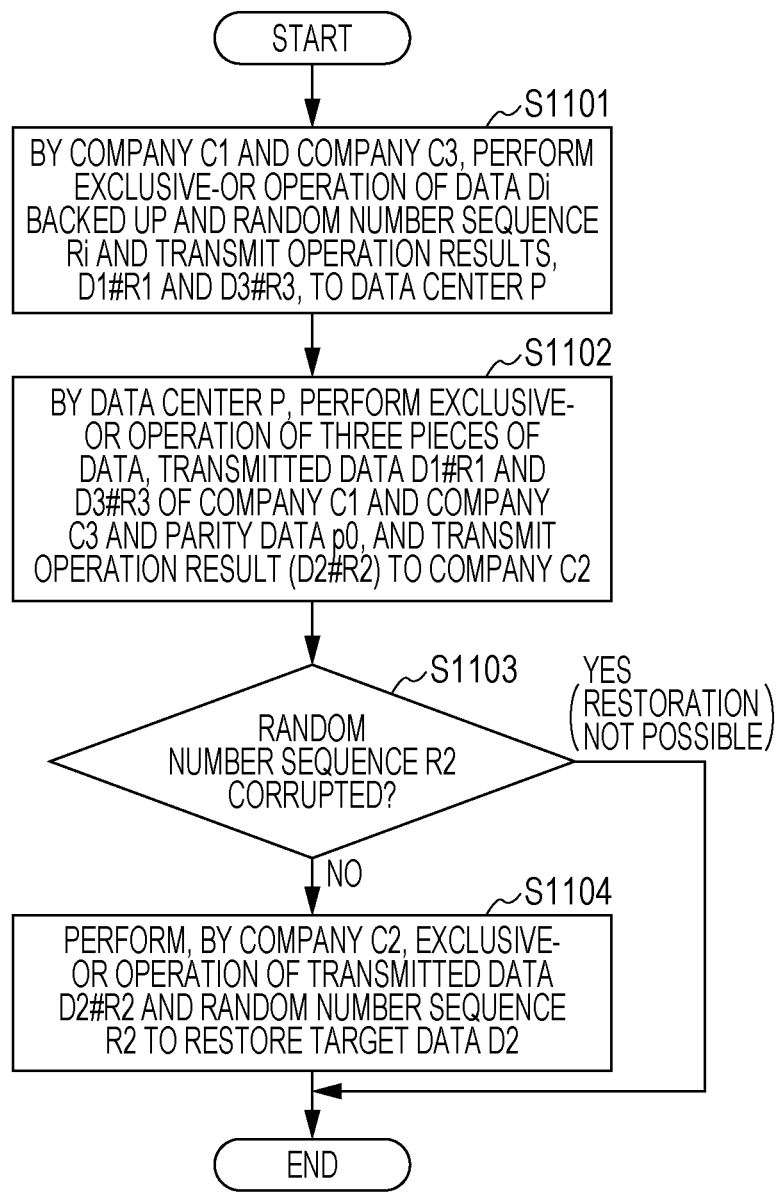
FIG. 11 is a flowchart illustrating an example of a data restoration process in the second embodiment.

Next, data restoration from data that has been backed up as described above will be described with reference to FIG. 10 and FIG. 11. The case where the data (D2) 11-2 of the user, Company C2, is restored will be described below by way of example; however, other data (D1 and D3) 11-1 and 11-3 is able to be restored likewise. FIG. 10 is a diagram illustrating restoration of data in the second embodiment, and FIG. 11 is a flowchart illustrating an example of a data restoration process in the second embodiment.

First, in step S1101, the information processing apparatuses 10-1 and 10-3 of Company C1 and Company C3 whose data is not to be restored each perform an exclusive-or operation of the data (Di) 11-$i$ backed up and the random number sequence (Ri) 12-$i$ and transmit an operation result (Di#Ri) to the information processing apparatus 20 of the data center P (P41). Note that i is an index, and i=1 or 3 here.

Next, in step S1102, the information processing apparatus 20 of the data center P performs an exclusive-or operation of three pieces of data, the data (D1#R1 and D3#R3) sent from the information processing apparatuses 10-1 and 10-3 of Company C1 and Company C3 and the parity data (P0). Here, since the parity data (P0) is (D1#R1)#(D2#R2)#(D3#R3), the result of this operation, (D1#R1)#(D3#R3)#(P0), is equal to the exclusive-or (D2#R2) of data (D2) to be restored and the random number sequence (R2). The information processing apparatus 20 of the data center P then transmits the operation result (D2#R2) to the information processing apparatus 10-2 of Company C2 whose data is to be restored (P42).

Next, in step S1103, the information processing apparatus 10-2 of Company C2 whose data is to be restored determines whether the random number sequence (R2) 12-2 retained by the information processing apparatus 10-2 is corrupted. If it is determined that the random number sequence (R2) 12-2 is not corrupted (No in S1103), then, in step S1104, the information processing apparatus 10-2 of Company C2 performs an exclusive-or operation of the data (D2#R2) sent from the information processing apparatus 20 of the data center P and the random number sequence (R2) to restore the data (D2) 11-2. Note that if it is determined that the random number sequence (R2) 12-2 is corrupted (Yes in S1103), restoration of the data (D2) 11-2 is not possible and therefore the process ends.

According to the second embodiment, the information processing apparatus 20 of the data center P, as is the case in the first embodiment, generates parity data based on data sent from a plurality of users and stores the parity data as backup data, and therefore the amount of backup data retained therein may be reduced. In addition, in restoring data backed up, the data is able to be restored by using data other than the data to be restored, the parity data, and the random number sequence.

In addition, since data encrypted with random number sequences that are unknown on the data center side is input to and output from the data center P, and data backed up is unable to be restored in the data center P, information leakage from the data center side may be inhibited. In addition, the random number sequences used for encryption are retained on the user side, enabling operations in a single data center.

Third Embodiment

Next, a third embodiment of the present disclosure will be described. In the third embodiment described below, the data center R retaining a random number sequence is not provided, and the random number sequence is retained in the data center P retaining parity data as backup data.

Figure 12:
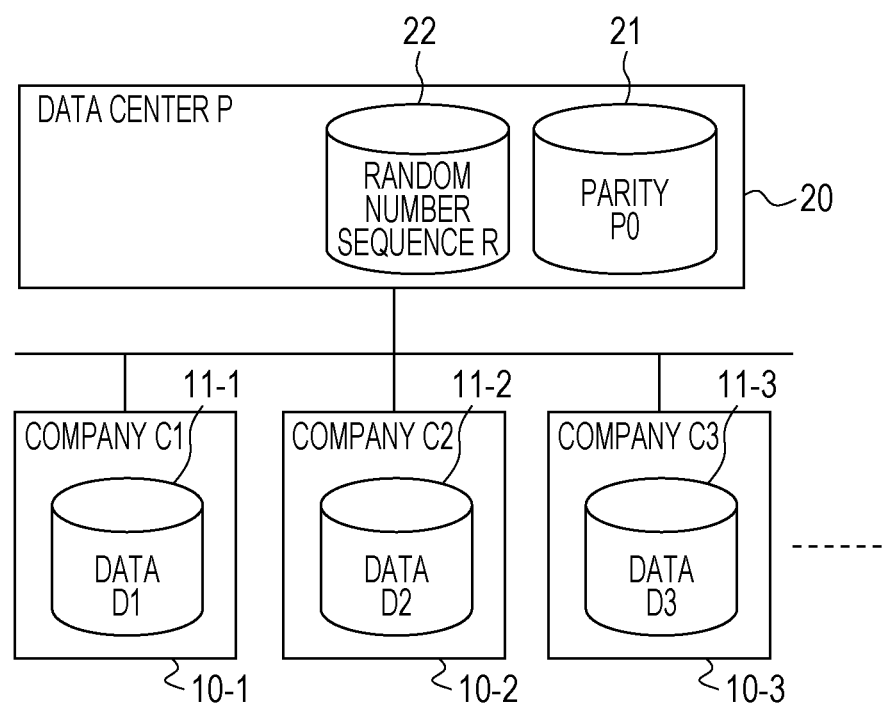
FIG. 12 is a diagram illustrating an example of a configuration of a data management system in a third embodiment.

FIG. 12 is a diagram illustrating an example of a configuration of a data management system in the third embodiment. The information processing apparatus 10-1 of Company C1 retains the data (D1) 11-1, the information processing apparatus 10-2 of Company C2 retains the data (D2) 11-2, and the information processing apparatus 10-3 of Company C3 retains the data (D3) 11-3.

The information processing apparatus 20 of the data center P manages backup data of a plurality of users in the form of the parity data (P0) 21. That is, the information processing apparatus 20 of the data center P retains, as backup data, the parity data (P0) 21 generated based on data to be backed up of a plurality of users. The information processing apparatus 20 of the data center P also retains a random number sequence (R) 22 with which the plurality of users communicate with the data center P. The random number sequence (R) 22 is used as an encryption key in encrypting data to be backed up and a decryption key in decrypting encrypted data.

Figure 13:
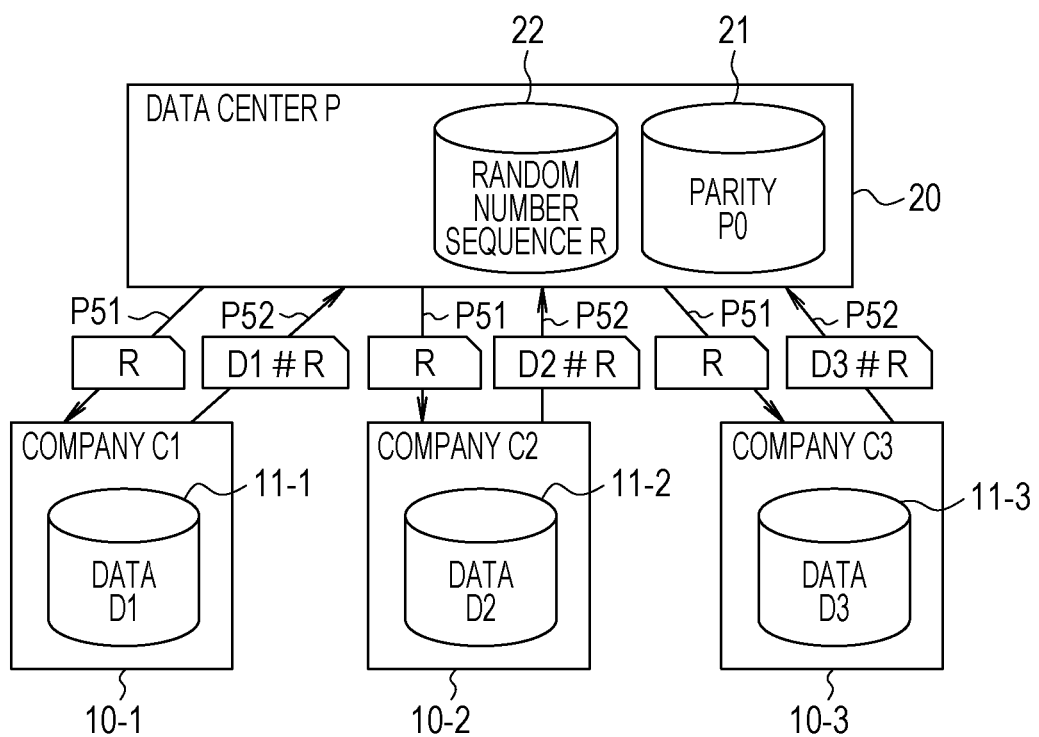
FIG. 13 is a diagram illustrating backup of data in the third embodiment.
Figure 14:
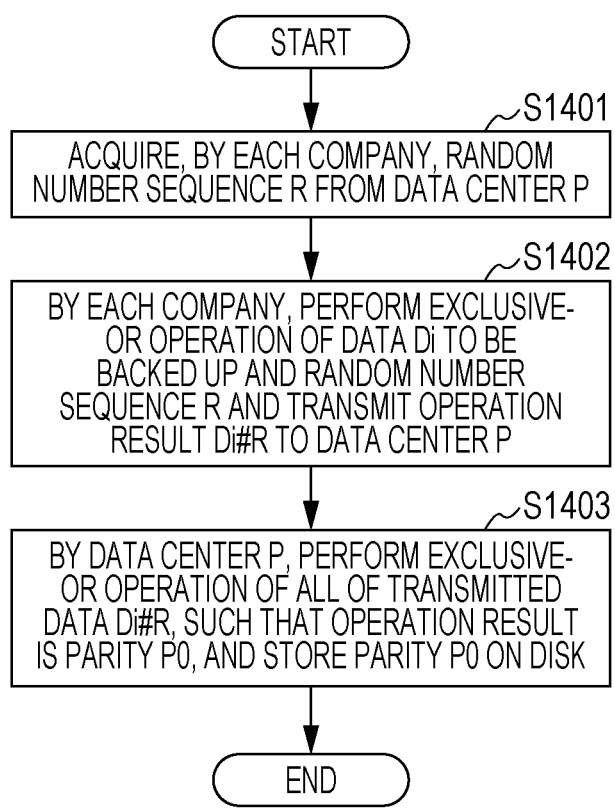
FIG. 14 is a flowchart illustrating an example of a data backup process in the third embodiment.

Backup of data in the third embodiment will be described with reference to FIG. 13 and FIG. 14. The case where three users, Company C1, Company C2, and Company C3, delegate management of backup of their data will be described below by way of example. FIG. 13 is a diagram illustrating backup of data in the third embodiment, and FIG. 14 is a flowchart illustrating an example of a data backup process in the third embodiment.

In step S1401, the information processing apparatuses 10-1, 10-2, and 10-3 of Company C1, Company C2, and Company C3 each acquire the random number sequence (R) 22 from the information processing apparatus 20 of the data center P (P51). Next, in step S1402, the information processing apparatuses 10-1, 10-2, and 10-3 of the companies each perform an exclusive-or operation of the data (Di) 11-$i$ to be backed up and the random number sequence (R) acquired in step S1401 and transmit an operation result (Di#R) to the information processing apparatus 20 of the data center P (P52). Note that i is an index, and i=1, 2, or 3 here.

Next, in step S1403, the information processing apparatus 20 of the data center P performs an exclusive-or operation of the data (Di#R) sent from the information processing apparatuses 10-1, 10-2, and 10-3 of the companies, such that the operation result is parity data (P0). In this example, the parity data (P0) is (D1#R)#(D2#R)#(D3#R). The information processing apparatus 20 of the data center P stores and retains the parity data (P0) as backup data on the disk 21.

Figure 15:
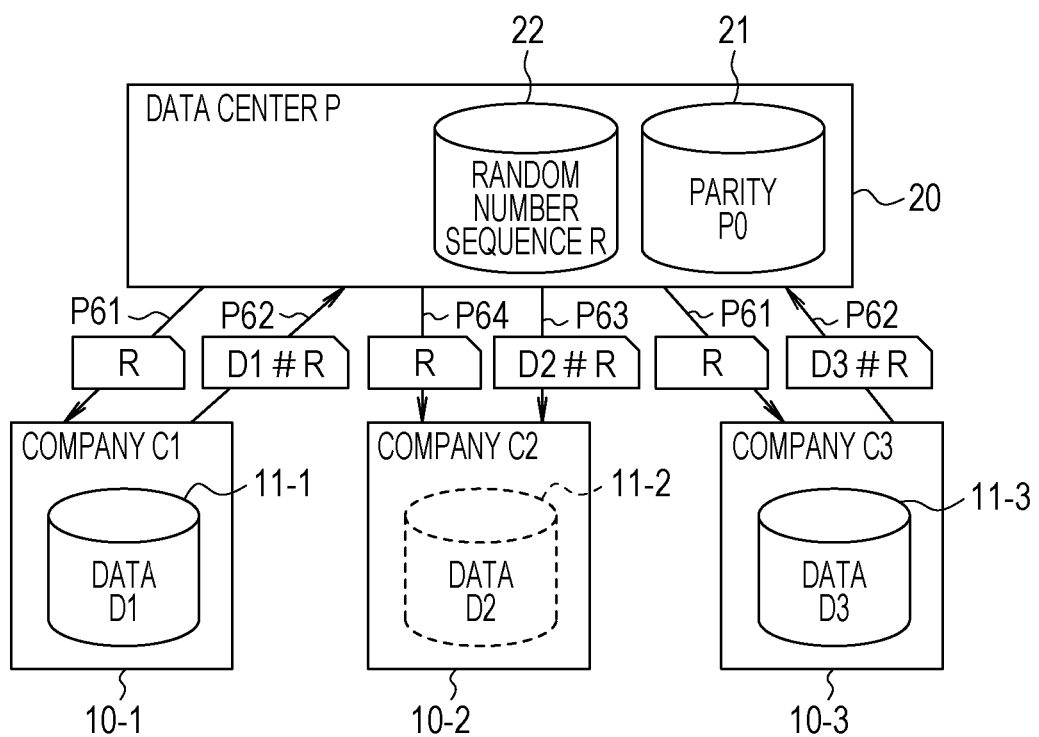
FIG. 15 is a diagram illustrating restoration of data in the third embodiment.
Figure 16:
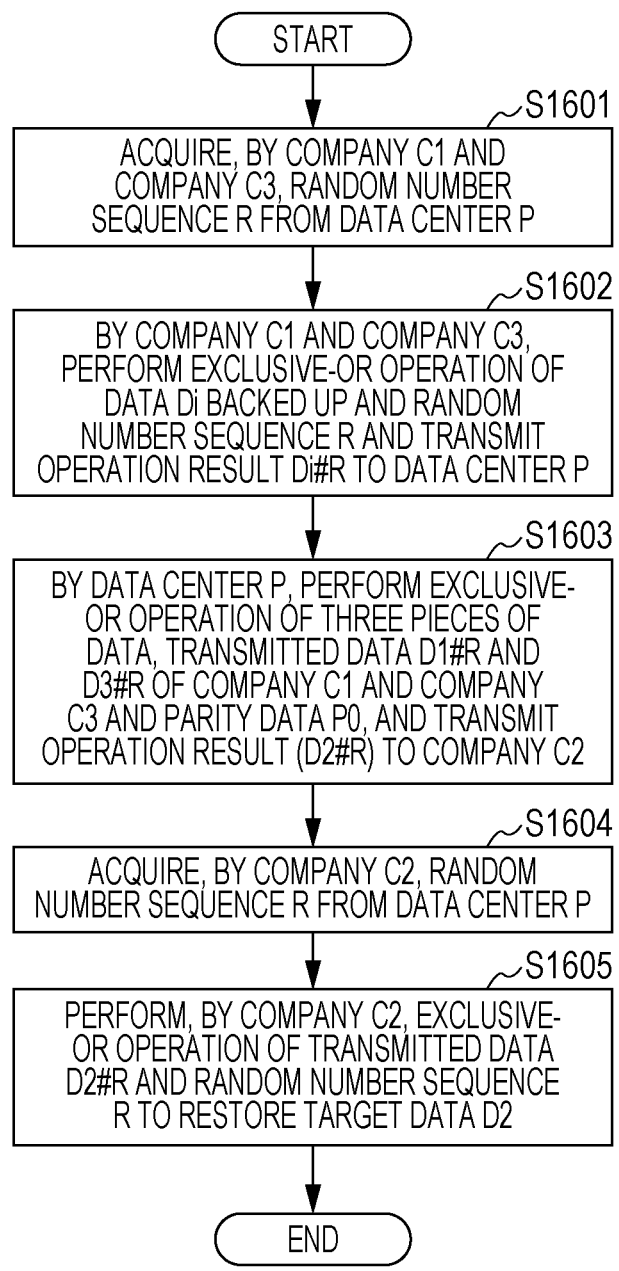
FIG. 16 is a flowchart illustrating an example of a data restoration process in the third embodiment.
Figure 17:
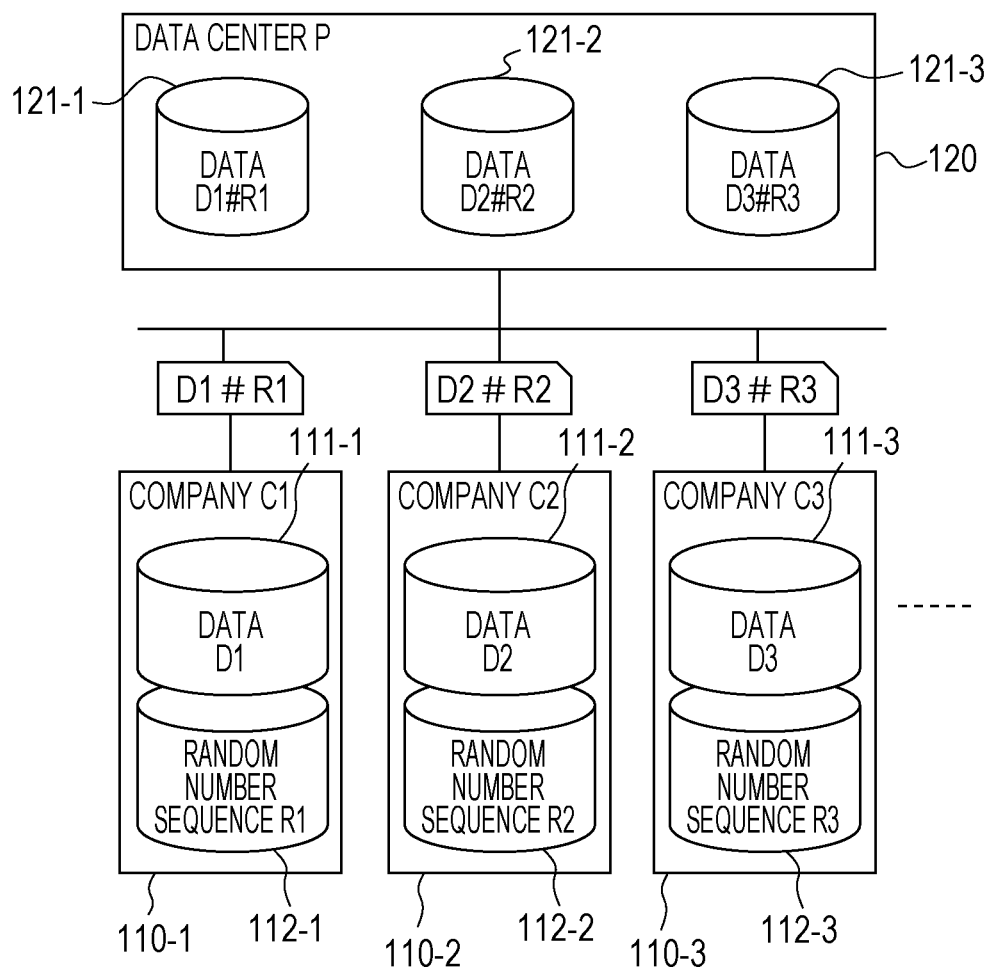
FIG. 17 is a diagram illustrating existing backup of data.

Next, data restoration from data that has been backed up as described above will be described with reference to FIG. 15 and FIG. 16. The case where the data (D2) 11-2 of the user, Company C2, is restored will be described below by way of example; however, other data (D1 and D3) 11-1 and 11-3 is able to be restored likewise. FIG. 15 is a diagram illustrating restoration of data in the third embodiment, and FIG. 16 is a flowchart illustrating an example of a data restoration process in the third embodiment.

First, in step S1601, the information processing apparatuses 10-1 and 10-3 of Company C1 and Company C3 whose data is not to be restored each acquire the random number sequence (R) 22 from the information processing apparatus 20 of the data center P (P61). Next, in step S1602, the information processing apparatuses 10-1 and 10-3 of Company C1 and Company C3 each perform an exclusive-or operation of data (Di) 11-$i$ backed up and the random number sequence (R) acquired in step S1601 and transmit an operation result (Di#R) to the information processing apparatus 20 of the data center P (P62). Note that i is an index, i=1 or 3 here.

Next, in step S1603, the information processing apparatus 20 of the data center P performs an exclusive-or operation of three pieces of data, data (D1#R and D3#R) sent from the information processing apparatuses 10-1 and 10-3 of Company C1 and Company C3 and the parity data (P0). Since the parity data (P0) is (D1#R)#(D2#R)#(D3#R), the operation result of this operation (D1#R)#(D3#R)#(P0) is equal to the exclusive-or (D2#R) of the data (D2) to be restored and the random number (R). The information processing apparatus 20 of the data center P then transmits the operation result (D2#R) to the information processing apparatus 10-2 of Company C2 whose data is to be restored (P63).

In step S1604, the information processing apparatus 10-2 of Company C2 whose data is to be restored acquires the random number sequence (R) 22 from the information processing apparatus 20 of the data center P (P64). Next, in step S1605, the information processing apparatus 10-2 of Company C2 performs an exclusive-or operation of the data (D2#R) sent from the information processing apparatus 20 of the data center P and the random number sequence (R) acquired in step S1604 to restore the data (D2) 11-2. Note that execution of step S1604 is not limited to the example illustrated in FIG. 16, and step S1604 may be executed at any point prior to executing step S1605.

According to the third embodiment, the information processing apparatus 20 of the data center P, as is the case in the first embodiment, generates parity data based on data sent from a plurality of users and stores the parity data as backup data, and therefore the amount of backup data retained therein may be reduced. In addition, in restoring data backed up, the data is able to be restored by using data other than the data to be restored, the parity data, and the random number sequence. In addition, since data backed up is able to be restored by using data acquired from the data center P, the data backed up is able to be restored, for example, even if data is corrupted because of a disaster or the like on the user side.

Note that although, in the foregoing first to third embodiments, the information processing apparatuses 10-1 to 10-3 encrypt data by performing an exclusive-or operation of data and a random number sequence; however, the present disclosure is not limited to this and may encrypt data in another way.

The processing in the information processing apparatus in each of the foregoing embodiments may be achieved, for example, by a computer executing a program. In addition, a computer-readable recording medium on which such a program is recorded may be applied as an embodiment of the present disclosure. As the recording medium, for example, a flexible disk, a hard disk, an optical disk, a magneto-optical disk, a compact disc read-only memory (CD-ROM), a magnetic tape, a nonvolatile memory card, a ROM, or the like may be used.

In addition, a computer program product with which the functions of the foregoing embodiments are achieved when a computer executes a program to perform processing may be applied as an embodiment of the present disclosure. Examples of the computer program product include programs themselves that implement functions of the foregoing embodiments and a computer in which a program is loaded. In addition, for the computer program product, a transmitting device capable of providing a program to a computer communicatively coupled thereto via a network, a network system including the transmitting device, and the like are mentioned.

In addition, in the case where the functions of the foregoing embodiments are implemented by a supplied program and an operating system (OS) running on a computer or another application or the like, such a program may be applied as an embodiment of the present disclosure. In addition, in the case where the functions of the foregoing embodiments are achieved when all or some of the processes of a supplied program are executed by a feature extension unit of a computer, such a program may be applied as an embodiment of the present disclosure. In addition, to make use of the present embodiments in a network environment, all or some of the programs may be executed on another computer.

Note that all of the foregoing embodiments represent nothing but an example of practices in embodying the present disclosure, and the technical scope of the present disclosure is not to be construed in a limited sense by these practices. That is, the present disclosure may be embodied in various forms without departing from the technical ideas or main characteristics thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and the processor configured to:
receive, respectively from a plurality of external devices, plural pieces of encrypted data encrypted with a random number sequence;
generate parity data by using the received plural pieces of encrypted data;
store the generated parity data in the memory;
receive a restoration request to restore first encrypted data from a first external device among the plurality of external devices;
receive, respectively from one or more second external devices among the plurality of external devices other than the first external device, one or more pieces of second encrypted data among the plural pieces of encrypted data other than the first encrypted data; and
restore the first encrypted data by using the received one or more pieces of second encrypted data and the parity data stored in the memory.

2. The information processing apparatus according to claim 1, wherein the processor is further configured to:
generate the parity data by performing an exclusive-or operation of the plural pieces of encrypted data; and
restore the first encrypted data by performing an exclusive-or operation of the one or more pieces of second encrypted data and the parity data.

3. The information processing apparatus according to claim 1, wherein the random number sequence is stored in an external device different from the information processing apparatus and the plurality of external devices.

4. The information processing apparatus according to claim 1, wherein the random number sequence is stored in each of the plurality of external devices.

5. The information processing apparatus according to claim 1, wherein the random number sequence is stored in the information processing apparatus.

6. The information processing apparatus according to claim 1, wherein the processor does not store the received plural pieces of encrypted data in the information processing apparatus and stores the generated parity data in place of the received plural pieces of encrypted data.

7. The information processing apparatus according to claim 1, wherein the processor is unable to restore any of the received plural pieces of encrypted data.

8. An information processing method executed by a computer, the information processing method comprising:
- receiving by the computer, respectively from a plurality of external devices, plural pieces of encrypted data encrypted with a random number sequence;
- generating parity data by using the received plural pieces of encrypted data;
- storing the generated parity data in a memory;
- receiving a restoration request to restore first encrypted data from a first external device among the plurality of external devices;
- receiving, respectively from one or more second external devices among the plurality of external devices other than the first external device, one or more pieces of second encrypted data among the plural pieces of encrypted data other than the first encrypted data; and
- restoring the first encrypted data by using the received one or more pieces of second encrypted data and the parity data stored in the memory.

9. A non-transitory computer-readable recording medium having stored therein a program that causes a computer to execute a process, the process comprising:
- receiving, respectively from a plurality of external devices, plural pieces of encrypted data encrypted with a random number sequence;
- generating parity data by using the received plural pieces of encrypted data;
- storing the generated parity data in a memory;
- receiving a restoration request to restore first encrypted data from a first external device among the plurality of external devices;
- receiving, respectively from one or more second external devices among the plurality of external devices other than the first external device, one or more pieces of second encrypted data among the plural pieces of encrypted data other than the first encrypted data; and
- restoring the first encrypted data by using the received one or more pieces of second encrypted data and the parity data stored in the memory.

* * * * *